Nov. 12, 1968   C. M. GILMAN   3,410,530
DRY SOLIDS CONTINUOUS BLENDING AND CONVEYING APPARATUS
Filed Dec. 26, 1967
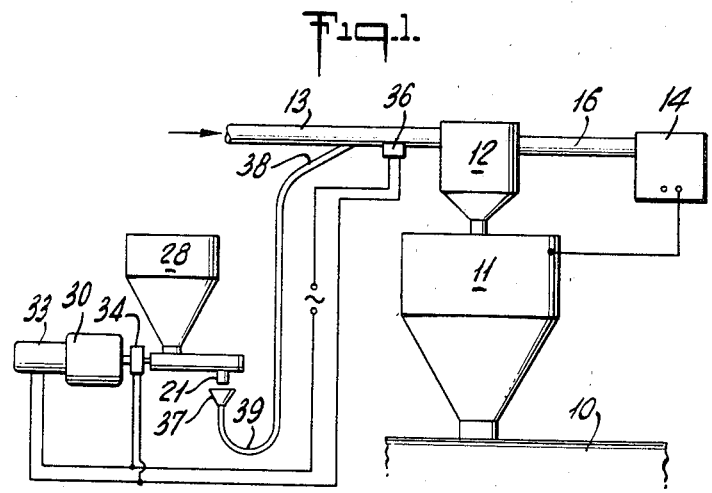
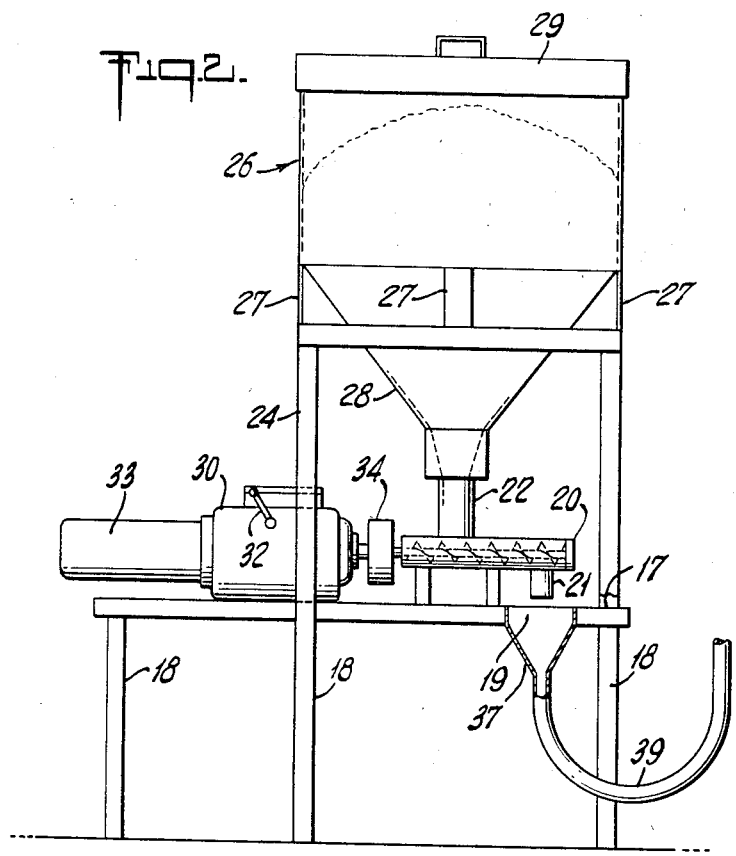
INVENTOR
CHARLES M. GILMAN
BY
William R. Lieberman
ATTORNEY

United States Patent Office 3,410,530
Patented Nov. 12, 1968

3,410,530
DRY SOLIDS CONTINUOUS BLENDING AND CONVEYING APPARATUS
Charles M. Gilman, Gilman, Conn., assignor to The Gilman Brothers Company, Gilman, Conn., a corporation of Connecticut
Filed Dec. 26, 1967, Ser. No. 693,472
10 Claims. (Cl. 259—4)

ABSTRACT OF THE DISCLOSURE

A continuous color blender for particulate plastic material associated with an extruder includes a vacuum-fed unloader hopper connected by a vacuum feed conduit to a silo containing the particulate plastic. A color concentrate feed pipe is connected to the vacuum feed conduit and terminates at its outer end in a feed hopper. A motor-driven screw feed device is actuated only during the delivery of plastic material to the unloader hopper and meters color concentrate to the feed hopper, the color concentrate being thoroughly mixed with the particulate plastic as it is transported to the unloading hopper.

Background of the invention

The present invention relates generally to improvements in blending apparatus and it relates particularly to an improved apparatus for the concurrent automatic blending and conveying of a plastic material and a coloring composition to a plastic extruder or molding device.

In the production of colored plastic products such as by extrusion injection molding or the like, it has been a common practice to dry-blend the particulate plastic material usually in a pellet or granular state with a pigment or dye by tumbling the mixture for about ten to twenty minutes to effect the homogeneous intermingling of the coloring with the particulate plastic material and its adherence thereto. The aforesaid procedure is of a batch nature and is dusty, awkward and time-consuming and possesses the drawback that a dusty material cannot be readily conveyed by air systems. An alternate procedure, better suited for bulk handling is to produce plastic pellets containing a high concentration of the coloring material and admixing these with the uncolored plastic pellets, for example, in a ratio of 1:20. The use of the coloring containing plastic pellets, that is, the so-called master-batch, is clean, dust-free and can be transported by air bulk-handling systems, both of the high pressure and vacuum type.

The methods heretofore employed for blending the coloring material and raw plastic, whether employing the concentrated pigment or the master-batch, possess numerous disadvantages. Where a batch system is employed it possesses the various drawbacks which accompany batch procedures and where a conventional continuously blending system is employed it is complex, unreliable and of little adaptability.

Summary of the invention

It is a principal object of the present invention to provide an improved solids-blending apparatus.

Another object of the present invention is to provide an improved continuous particulate solids-blending and conveying apparatus.

Still another object of the present invention is to provide an improved apparatus for uniformly blending a particulate material with an air conveyed material.

A further object of the present invention is to provide an improved apparatus for continuously metering and blending an additive to an air-conveyed material with and in response to the air transportation of the material.

Still a further object of the present invention is to provide an improved apparatus for the blending of a coloring material with a plastic in a bulk-handling conveying system.

Another object of the present invention is to provide an apparatus of the above nature characterized by its reliability, flexibility, adaptability and simplicity.

The above and other objects of the present invention will become apparent from a reading of the following description taken in conjunction with the accompanying drawing which illustrates a preferred embodiment thereof.

In a sense the present invention contemplates the provision of an apparatus for the blending of a particulate additive with a particulate plastic material comprising a plastic treating device, an unloading chamber having an outlet communicating with said plastic-treating device, suction means connected to said chamber, a conduit connecting said chamber to a source of a particulate material, a feed pipe communicating with said conduit between thet ends thereof, and means for metering a particulate material into said pipe.

According to a preferred form of the present improved apparatus the vacuum unloader discharges into the hopper of a plastic extruder and has a feed port connected by a conveyor conduit to a plastic pellet-containing silo and an evacuating port connecting to a suitably-controlled vacuum pump. A pipe communicates with the conveyor conduit at a point trailing the unloader and terminates in an open-topped funnel. A screw type metering pump discharges into the funnel and is provided with a master-batch-containing feed hopper. The feed screw is connected through an electric clutch and a variable speed drive to an electric motor and means are provided for energizing the motor and closing the clutch only when plastic material is being vacuum-transported along the conduit.

Brief description of the drawing

FIGURE 1 is a diagrammatic view of a system embodying the present invention; and
FIGURE 2 is a front fragmentary view of the additive metering section thereof.

Description of the preferred embodiment

Referring now to the drawing which illustrates a preferred embodiment of the present invention as applied to the production of colored thermoplastic extrusions, reference numeral 10 generally designates an extruder of conventional construction for synthetic organic thermoplastic resins and includes a feed hopper 11 disposed above and communicating with the trailing end of the extruder. Positioned above and communicating with hopper 11 is a vacuum unloader hopper 12 having a discharge outlet directed into extruder hopper 11.

Unloader hopper 12 and the associated vacuum air transport and control system are of conventional and known construction and include a conduit 13 connecting unloader hopper 12 to a silo or other relatively large supply of a particulate plastic material, for example in granular or pellet form. Unloader hopper 12 is also connected to a vacuum pump system 14 by way of a conduit 16. It should be noted that unloader hopper discharge and conduit 16 are so valved and the vacuum pump system 14 so controlled that upon filling of the unloader hopper 12 it closes communication between hopper 12 and vacuum pump 14 and opens the unloader discharge opening to effect the emptying of hopper 12 into extruder hopper 11, and following the emptying of unloader hopper 12 the discharge opening is closed and communication reestablished with vacuum pump 14 whereby to effect flow of reduced pressure air through the conduit 13 and unloader hopper 12, thereby to convey the particulate plastic material from its source through conduit 13 into hopper 12 until the latter is filled. The flow of plastic material through the conduit 13 is accompanied by a drop of pressure therein which is present substantially only during such material flow.

The additive injection section includes a horizontal plate 17 suitably supported on legs 18 depending from the corners of plate 17 and preferably mounted on casters (not shown) to facilitate the movement of the injection assembly. An opening 19 is formed in plate 17 and a solid particulate material metering device, such as a screw feed metering device 20 is suitably mounted on plate 17 above opening 19. Metering device 20 includes, at its leading end, a depending outlet pipe 21 axially registering with the opening 19 and at its trailing end an upwardly directed inlet pipe 22.

A horizontal frame member 23 is located above inlet pipe 22 and is supported on mounting plate 17 by legs 24 depending from the frame member 23. An open-topped hopper 26 registers with and is carried by frame 23 by means of a plurality of upright legs 27 extending from the frame 23 and secured to the peripheral wall of the hopper 26. Hopper 26 includes a depending funnel-shaped section 28 which discharges into metering device inlet pipe 22. The top of hopper 26 is closed by a separable lid 29.

Mounted on plate 17 is a variable speed transmission 30 provided with a hand crank 32 for adjusting the speed ratio of the transmission 30. An electric motor 33 is mounted on transmission 30 and is drive-coupled to the input shaft thereof. Also mounted on variable speed transmission 30 is an electro-magnetic clutch 34 with its input shaft drive-coupled to the output shaft of transmission 30 and its output shaft coupled to the drive shaft of metering device 20. Electromagnetic clutch 34 is in a closed or drive condition when energized and in an open or uncoupled condition when deenergized, and may be provided with a braking section which is actuated and deactuated with the energizing and deenergizing respectively of the clutch.

A pressure-sensitive switch 36 is mounted on conduit 13 and exposed to the interior thereof. Switch 36 is normally open and is of the type which is actuated to a closed condition with a drop in pressure in conduit 13 attendant the vacuum air conveyance of material therethrough. It should be noted that the switch 36 may be otherwise actuated in other positions when a flow of low pressure material conveying air is effected in the conduit 13; for example it may be controlled by the vacuum pump system 14. Motor 33 and clutch 34 are electrically connected in parallel and are connected through switch 36 to a suitable source of energizing current. In the alternative, motor 33 may be connected to a source of current independent of switch 36 and only the energization of clutch 34 controlled by switch 36.

A depending funnel-shaped member 37 is mounted in engagement with the plate opening 19 and in registry with the metering device outlet 21. An inlet pipe 38 is mounted on and communicates with the interior of conduit 13 at a point trailing hopper 12 and forward of the source of plastic material and is at an angle to conduit 13, being forwardly directed from the trailing toward the leading end of the conduit 13. A tube 39 connects the throat of the funnel member 37 to the injection pipe 38.

Considering now the operation of the apparatus described above, hopper 26 is filled with a material which is to be admixed with the plastic material fed to the extruder hopper 11, for example, a masterbatch in pellet form containing a high proportion of pigment carried in a matrix of a plastic similar to that being delivered by conduit 13. Transmission 30 is adjusted in accordance with the desired proportion of feed of masterbatch to plastic and the vacuum-conveying system actuated. Upon the unloading of material into extruder hopper 11 the extruder 10 is started. When the material in extruder hopper 11 is below a predetermined level and the unloader hopper 12 empty, the unloader hopper discharge is closed and the vacuum system 14 operated to suck air through conduit 13 and unloader hopper 12, the flow of air picking up the particulate plastic from the silo and conveying it through conduit 13 and depositing it in unloader 12. The reduction of pressure in the conduit 13 closes the switch 36 thereby to energize motor 33 and clutch 34, to drive the metering device 20 which feeds masterbatch into funnel 37. The reduced pressure sucks the masterbatch through pipe 38 and tube 39 into conduit 13, the masterbatch being thoroughly admixed with the raw plastic pellets while conveyed therewith through conduit 13 and deposited in hopper 12. Upon the filling of hopper 12, the vacuum pumping is automatically halted to stop the flow of air and the conveying of plastic through conduit 13 and to increase the pressure therein, which pressure increase opens switch 36 to stop motor 33, opens clutch 34 and stops the metering device 20. The above cycle is intermittently repeated whenever the material in the extruder hopper 11 falls below the desired level. The proportion of masterbatch to plastic may be adjusted merely by varying the speed ratio of the transmission 30.

While there has been described and illustrated a preferred embodiment of the present invention, it is apparent that numerous alterations, omissions and additions may be made without departing from the spirit thereof.

What is claimed is:

1. An apparatus for the blending of a particulate additive with a particulate plastic material comprising a plastic treating device, an unloading chamber having an outlet communicating with said plastic treating device, suction means connected to said chamber, a conduit connecting said chamber to a source of a particulate plastic material, a feed pipe communicating with said conduit between the ends thereof, and means for metering a particulate material into said pipe.

2. The apparatus of claim 1, including means for activating and deactivating said metering means in response to said suction means.

3. The apparatus of claim 1, including means for activating and deactivating said metering means in accordance with the fluid flow in said conduit.

4. The apparatus of claim 3, wherein said activating and deactivating means is responsive to the pressure in said conduit to activate and deactivate said metering means with the drop and rise of said pressure below and above a predetermined level respectively.

5. The apparatus of claim 1, wherein said pipe communicates with said conduit in an upstream directed angle toward said unloader.

6. The apparatus of claim 1, wherein said metering device comprises a screw feed device having an outlet port and an inlet port, means providing communication between said outlet port and said feed pipe, said feed pipe having an air inlet opening, a storage hopper communicating with said inlet port, and means responsive to said suction means for driving said screw feed device.

7. The apparatus of claim 6, wherein said driving means comprises a drive motor and means responsive to the pressure in said conduit for coupling and uncoupling said drive motor and screw feed device as said pressures fall below and rise above a predetermined value.

8. The apparatus of claim 6, wherein said outlet port is downwardly directed and said communication means includes a receiver positioned below said outlet port and connected to said feed pipe at said air inlet opening.

9. The apparatus of claim 6, wherein said feed screw driving means includes an electric motor and means including a variable speed transmission connecting said motor to said feed screw.

10. The apparatus of claim 1, including means for adjusting the rate of said metering means.

References Cited

UNITED STATES PATENTS

| | | | |
|---|---|---|---|
| 2,164,542 | 7/1939 | Owens | 259—11 XR |
| 3,182,969 | 5/1965 | Rupp | 259—25 |
| 3,361,413 | 1/1968 | Heyl | 259—4 |

WALTER A. SCHEEL, *Primary Examiner.*

J. M. BELL, *Assistant Examiner.*